June 24, 1952  O. H. SCHMITT  2,601,226
NOISE GENERATOR
Filed Aug. 21, 1944
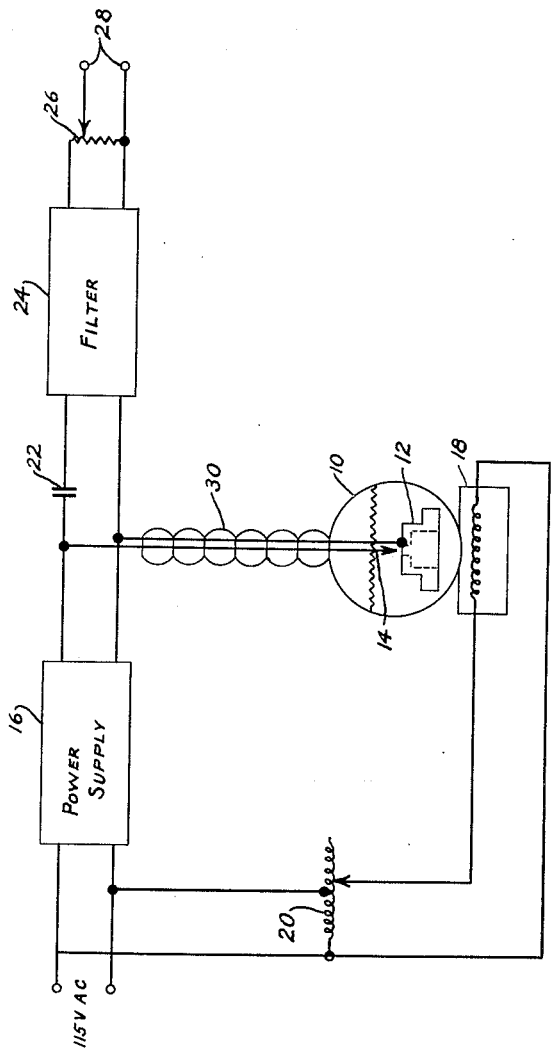
Inventor
Otto H. Schmitt
By
F. Schmitt
Walter S. Paul.
Attorneys Patented June 24, 1952

2,601,226

UNITED STATES PATENT OFFICE 2,601,226

NOISE GENERATOR

Otto H. Schmitt, Port Washington, N. Y., assignor to the United States of America as represented by the Secretary of the Navy Application August 21, 1944, Serial No. 550,476

8 Claims. (Cl. 321—2)

This invention relates to noise generators, and more particularly to means for producing random voltage variations or "noise" in an electrical system.

In the development and testing of electrical systems, it is sometimes desirable to produce random variations in voltage which may be superimposed on the normal input signal as an aid in the investigation of the effects on the system of electrical noise from external sources. Thus, in the investigation of trigger circuits designed to operate in response to an input signal of chosen characteristics, a source of randomly varying voltage may be used to determine whether the circuit can be triggered by random noise due to external influences.

In another application, the source of random noise may be used for training purposes in connection with certain types of detection equipment. The noise signal may be applied to the equipment together with desired signals and a trainee may be required to discriminate between desired and spurious output signals, the proportion of desired signal to the noise being altered to simulate various conditions met in actual operation of the equipment.

In addition, in systems including relays or other electro-mechanical devices, the introduction of small but random variations in applied voltage may be useful for eliminating stickiness caused by static friction in such electro-mechanical devices. Thus, small random variations in the applied voltage cause continual small displacements of the electro-mechanical devices insufficient to cause significant operation thereof, but sufficient to prevent them from remaining in a static condition.

Accordingly, there is proposed a device for introducing random voltage variations in an electrical system, comprising a container of electrolyte, a pair of electrodes immersed in the electrolyte, means causing a substantially constant current to flow between the electrodes, means for causing the electrolyte to gush irregularly over the electrodes, and means for applying the voltage developed across the varying interelectrode electrolytic resistance to the electrical system.

The noise generator of the invention is illustrated schematically in the accompanying drawing.

Referring to the drawing, there is provided a container 10 for a solution of electrolyte, as, for example, magnesium sulphate. A domed electrode 12 having an opening at the top of the dome is suspended in the electrolyte and a second electrode 14, which may conveniently be a platinum wire, is suspended in the electrolyte directly above the opening in the domed electrode. A substantially constant current from a suitable power supply 16 is passed continuously between the electrodes. Conveniently, power supply 16 may operate from the 115-bolt A.-C. line and comprise the usual electronic rectifier and suitable filtering and regulating circuits, although any suitable source may be used. If the electrolyte is agitated and caused to gush irregularly over the electrodes, the electrical resistance of the solution to the passage of current between the electrodes varies in a random fashion. Consequently, the voltage between the electrodes varies irregularly and contains many frequency components principally in the audio and sub-audio range.

In order to produce the requisite gushing of the electrolyte, the solution is heated to boiling by means of an electric stove or unit heater 18, the domed electrode 12 then acting in the manner of a percolator to cause random gushing of the electrolyte between the electrodes. Conveniently, heater 18 may be supplied from the 115-volt A.-C. line through an adjustable auto-transformer 20 by means of which the temperature of the heater may be adjusted. Such adjustment alters the rate of boiling of the solution and has considerable effect on the nature of the voltage between the electrodes.

The voltage between electrodes 12 and 14 is applied through a blocking capacitor 22 to a filter 24 by means of which chosen frequency components of the randomly varying voltage may be isolated. The output of filter 24 is applied through attenuator 26 to output terminals 28 which may be connected to the electrical system in which it is desired to introduce random variations in operation. The noise level may be adjusted by attenuator 26, while the general nature of the noise may be varied by adjusting auto-transformer 20, thereby to alter the manner in which the electrolyte gushes over the electrodes.

In some instances, as, for example, when two or more detection systems must be used together in order to obtain desired information, it may be desirable, for testing and training purposes, to provide several sources of randomly varying voltage, the variations in which bear some slight degree of correlation. In this event, additional domed electrodes and wire electrodes may be suspended in the solution of electrolyte. All of the domed electrodes are then connected together electrically and the voltages developed between the several domed electrodes and the wire electrodes respectively associated therewith are applied to separate filters and output circuits similar in all respects to those described above. Since the electrode systems are suspended in a common boiler, some degree of correlation exists between the several randomly varying voltages so produced.

In order to prevent loss of the electrolyte and to avoid the necessity of constant attention to the noise generator, an air condenser 30 is provided by means of which vaporized electrolyte from the boiling solution in container 12 is condensed and returned to solution.

What is claimed is:

1. A device for introducing random voltage variations in an electrical system, comprising a container of electrolyte, a pair of electrodes immersed in the electrolyte, means causing a substantially constant current to flow between the electrodes, means for causing the electrolyte to gush irregularly over the electrodes, and means for applying the voltage developed across the varying interelectrode electrolytic resistance to the electrical system.

2. A device for introducing random voltage variations in an electrical system, comprising a container of electrolyte, a pair of electrodes immersed in the electrolyte, means causing a substantially constant current to flow between the electrodes, means for causing the electrolyte to gush irregularly over the electrodes, means for applying the voltage developed across the varying interelectrode electrolytic resistance to a filter, and means for controlling said voltage upon application to an electrical system.

3. In a noise producing circuit, the combination of an electrolyte, a pair of electrodes therein, means for passing a substantially constant direct current between said electrodes through said electrolyte, means for agitating said electrolyte to vary its effective resistance, and means for picking off the resulting varying potential across said electrodes and delivering it as a source of "noise."

4. The combination defined in claim 3, wherein a container is provided for said electrolyte having a long open neck, and said agitating means comprise a heater for said electrolyte, said neck serving as a condenser for recapturing the vaporized electrolyte before it escapes into the atmosphere.

5. A combination defined in claim 3, wherein a container is provided for said electrolyte, and said agitating means comprise a heater for bringing the electrolyte to a boil, one of said electrodes being in the form of an inverted cup to catch the bubbles of the boiling electrolyte, said cup having an opening in its top, said other electrode being positioned over said opening.

6. The combination defined in claim 3, wherein said means for picking off and delivering said potential includes a pair of conductors connected to said electrodes, and a condenser in one of said conductors for blocking the passage of the direct current into said delivering means.

7. The combination defined in claim 6, a filter in said delivering means for isolating chosen frequency components, as may be desired for use in the output of said delivering means.

8. The combination defined in claim 7, including a potentiometer across the output of said delivering means for controlling the intensity of said output.

OTTO H. SCHMITT.

REFERENCES CITED

The following references are of record in the file of this patent:

UNITED STATES PATENTS

| Number | Name | Date |
|---|---|---|
| 689,438 | Topham | Dec. 24, 1901 |
| 732,631 | Hambuechen | June 30, 1903 |
| 929,371 | Arsem | July 27, 1909 |

FOREIGN PATENTS

| Number | Country | Date |
|---|---|---|
| 387,982 | France | of 1908 |